United States Patent
Saboor et al.

(10) Patent No.: US 9,553,730 B2
(45) Date of Patent: Jan. 24, 2017

(54) CERTIFICATING AUTHORITY TRUST EVALUATION

(71) Applicant: Microsoft Corporation, Redmond, WA (US)

(72) Inventors: Anooshiravan Saboor, Seattle, WA (US); Muhammad Umar Janjua, Bellevue, WA (US); Nelly Porter, Kirkland, WA (US); Philip Hallin, Port Townsend, WA (US); Haitao Li, Sammamish, WA (US); Xiaohong Su, Sammamish, WA (US); Kelvin Yiu, Bellevue, WA (US); Anthony Paul Penta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/020,491

(22) Filed: Sep. 6, 2013

(65) Prior Publication Data
US 2014/0359280 A1 Dec. 4, 2014

Related U.S. Application Data

(60) Provisional application No. 61/830,121, filed on Jun. 2, 2013.

(51) Int. Cl.
*H04L 29/06* (2006.01)
*H04L 9/32* (2006.01)

(52) U.S. Cl.
CPC ............ *H04L 9/3268* (2013.01); *H04L 9/321* (2013.01); *H04L 9/3263* (2013.01); *H04L 9/3265* (2013.01); *H04L 63/0823* (2013.01)

(58) Field of Classification Search
CPC ...... H04L 9/3263; H04L 9/3265; H04L 9/3268
(Continued)

(56) References Cited

U.S. PATENT DOCUMENTS 6,148,083 A 11/2000 Fieres et al.
7,058,619 B2 6/2006 Wanish
(Continued)

OTHER PUBLICATIONS

"What are CA Certificates?", http://technet.microsoft.com/en-us/library/cc778623 Published Date: Jul. 26, 2011 pp. 10.
(Continued)

*Primary Examiner* — Edward Zee
(74) *Attorney, Agent, or Firm* — Timothy Churna; Judy Yee; Micky Minhas

(57) ABSTRACT

In many information security scenarios, a certificate issued by a certificating authority may be presented to a client in order to assert a trust level of a certificated item, such as a message or a web page. However, due to a decentralized structure and incomplete coordination among certificating authorities, the presence and exploitation of security vulnerabilities to issue untrustworthy certificates may be difficult to determine, particularly for an individual client. Presented herein are techniques for providing a certificating authority trust service that collects and evaluates certificates submitted to clients by certificating authorities, and advises the clients of a certificating authority trust level for respective certificating authorities (e.g., determined as a consensus of the evaluated certificates issued by the certificating authority). The clients may use a certificating authority trust set distributed by the certificating authority trust service to determine whether to trust a certificate issued from a particular certificating authority.

22 Claims, 8 Drawing Sheets

(58) Field of Classification Search
USPC .............................. 726/5, 6, 7; 713/155, 156
See application file for complete search history.

(56) References Cited

U.S. PATENT DOCUMENTS

| | | | |
|---|---|---|---|
| 8,214,634 B1* | 7/2012 | Steele et al. .................. | 713/152 |
| 8,327,128 B1 | 12/2012 | Prince et al. | |
| 8,341,399 B2 | 12/2012 | Brown | |
| 9,077,546 B1* | 7/2015 | Rakshit ................. | H04L 9/3265 |
| 2002/0078347 A1* | 6/2002 | Hericourt et al. ........... | 713/156 |
| 2003/0018585 A1 | 1/2003 | Butler | |
| 2003/0182549 A1* | 9/2003 | Hallin .................... | G06F 21/33 |
| | | | 713/156 |
| 2005/0080899 A1 | 4/2005 | Vogel | |
| 2006/0015729 A1 | 1/2006 | Novack et al. | |
| 2008/0028443 A1 | 1/2008 | Adelman | |
| 2008/0232583 A1 | 9/2008 | DiCrescenzo et al. | |
| 2012/0216035 A1 | 8/2012 | Leggette et al. | |
| 2012/0284508 A1 | 11/2012 | Zaverucha | |
| 2013/0014020 A1 | 1/2013 | Dixon | |
| 2013/0061281 A1 | 3/2013 | Pao | |
| 2014/0237091 A1* | 8/2014 | Sabin ...................... | H04L 63/00 |
| | | | 709/223 |

OTHER PUBLICATIONS

"Imperial Violet", https://www.imperialviolet.org/2011/05/04/pinning.html Published Date: May 4, 2011 pp. 2.

"Certificate Patrol", http://patrol.psyced.org/ Retrieved Date: May 16, 2013 pp. 9.

Soghoian, Christopher; "Certified Lies: Detecting and Defeating Government Interception Attacks Against SSL" http://files.cloudprivacy.net/ssl-mitm.pdf Published Date: Feb. 28, 2011 pp. 20.

Laurie,B.; "Certificate Transparency" In Proceedings of in Network Working Group, Internet-Draft. http://tools.ietf.org/pdf/draft-laurie-pki-sunlight-12.pdf Published Date: Apr. 18, 2013 pp. 34.

Kotler, Mathew, et al; U.S. Appl. No. 29/446,806 "Display Screen With Graphical User Interface", filed Feb. 27, 2013.

Int. Search Report PCT Application No. PCT/US2013/061082 dated Jan. 20, 2014, 11 pgs.

"A Formal Model of Trust for Calculating the Quality of X.509 Certificate", Wazan Ahmad Samer, Laborde Romain, Barrere Francois and Benzekri Abdel Malek, May 5, 2010, Security and Communication Networks, vol. 4, No. 6, 57 pgs.

"Use of a Validation Authority to Provide Risk Management for the PKI Relying Party", Jon Olnes and Leif Buene, Jan. 1, 2006, Public Key Infrastructure, Lecture Notes in Computer Science, vol. 4043, pp. 1-15.

Non-Final Office Action U.S. Appl. No. 14/449,716 dated Apr. 1, 2015, 32 pgs.

Reply Non-Final Office Action U.S. Appl. No. 14/449,716 dated Jul. 1, 2015, 16 pgs.

Final Office Action U.S. Appl. No. 14/449,716 dated Jul. 16, 2015, 32 pgs.

Non-Final Office Action U.S. Appl. No. 14/449,684 dated Sep. 10, 2015, 48 pgs.

Reply Final Office Action U.S. Appl. No. 14/449,716 dated Dec. 3, 2015, 20 pgs.

Reply Non-Final Office Action U.S. Appl. No. 14/449,684 dated Nov. 25, 2015, 18 pgs.

* cited by examiner

CERTIFICATING AUTHORITY TRUST EVALUATION

BACKGROUND

Within the field of computing, many scenarios involve authentication using a certificate issued by a certificating authority. For example, a user may connect to a website to perform a sensitive interaction, such as a financial transaction, using credentials that might be misused if intercepted by a third party. Accordingly, the website may submit a certificate verifying its identity and signed by a certificating authority. The device of the user may examine the cryptographic signatures of the certificate to verify its authenticity that the identity of the issuer and the authenticity of the certificate before proceeding with the transaction and the provision of credentials.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The certificating authority system is subject to exploitation due to a variety of technical and non-technical aspects. As a first example, vulnerabilities may be discovered and exploited in the mathematical models on which security techniques are based; e.g., flaws in the MD5 hashing algorithm may permit the forgery of certificates or the alteration of signed content. As a second example, under the current certification model, a set of certificating authorities is identified and globally trusted, such that any certificating authority may issue certificates for any domain; as a result, the exploitation, coercion, or malicious actions of any one certificating authority may result in the issuance of inauthentic certificates for any domain. As a third example, it may be difficult to detect exploits of certificating authorities, particular certificates, and the security models involved therein, because relevant information may be withheld (e.g., certificating authorities often do not provide public records of issued certificates and/or currently utilized security techniques), and/or may be unable to assess outside of a collective process that currently does not exist (e.g., some types of exploits may be apparent from a collection of certificates submitted to a variety of users, but may be undetectable from individual certificates).

In view of these limitations, the present disclosure involves a collective model for gathering, evaluating, and disseminating trust information about certificating authorities and certificates. In accordance with this model, a trust advising service may collect a set of certificates received by various users (e.g., the web browsers of individual users, and/or a trusted set of crawlers that crawl the internet and download certificates) provided by various domains under various circumstances. The trust advisor may evaluate the collection of certificates, e.g., using an automated evaluation process involving a set of heuristics such as the concurrence issuance of certificates for a particular domain from different certificating authorities, that may reveal the trustworthiness of the certificating authority and/or the exploitation of vulnerabilities in certificating security techniques. Based on these determinations, the trust advisor may generate a certificating authority trust set indicating the current trust level of various certificating authorities, and may disseminate the certificating authority trust set to a set of devices, such as a set of web browsers. The devices may then evaluate any subsequently received certificate, issued by a certificating authority on behalf of a particular domain, in view of the trust level of the certificating authority indicated by the certificating authority trust set. In this manner, the techniques presented herein may enable the devices to evaluate the trust of certificates using collective information in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
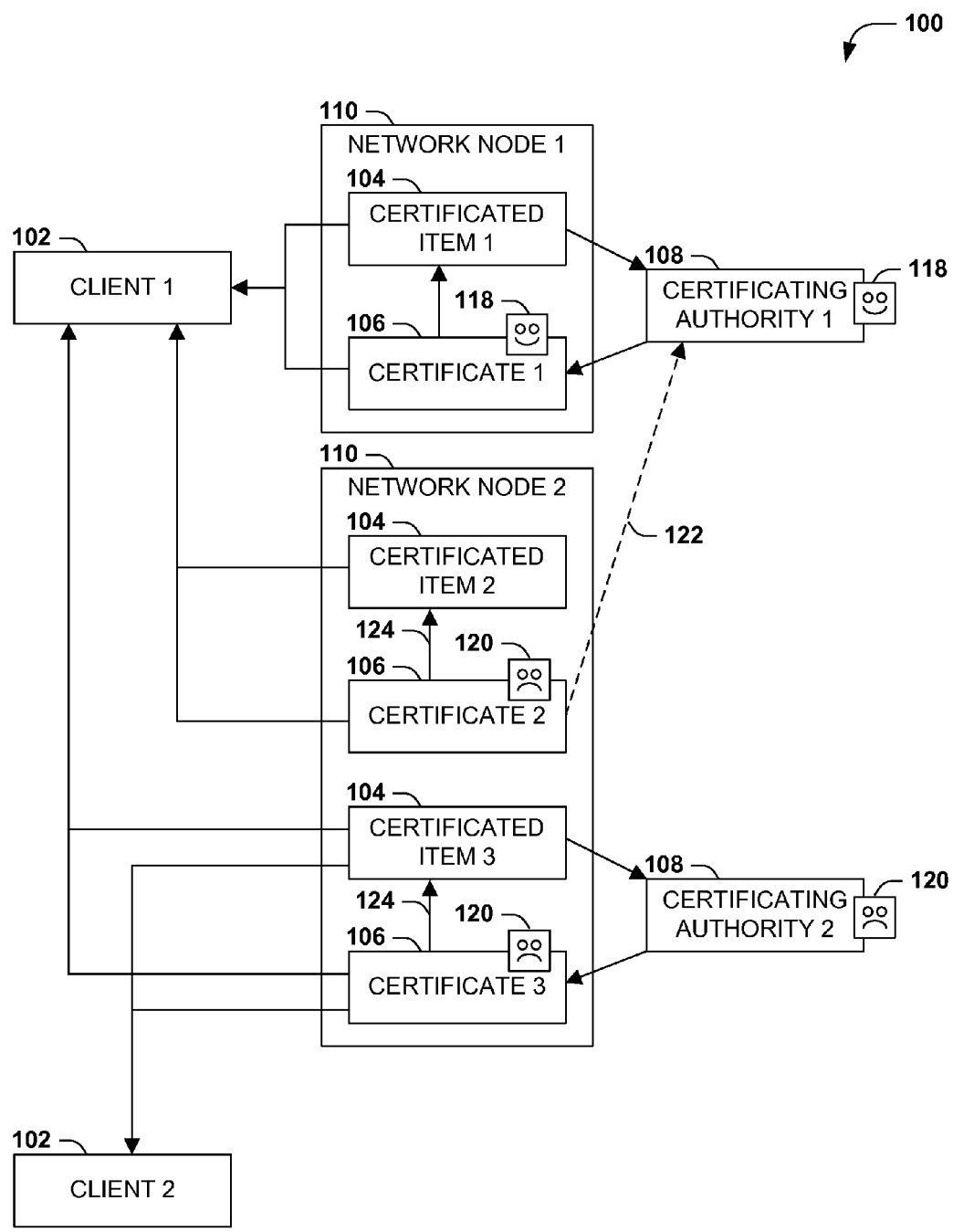
FIG. 1 is an illustration of an exemplary scenario featuring a set of certificating authorities issuing certificates for certificated items to clients.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an exemplary scenario 100 featuring a set of certificating authorities 108 issuing certificates 106 to various clients 102. In this exemplary scenario 100, a first client 102 may communicating over a network (a cellular network or the Internet) may request a certificated item 104 from a first node 110 of the network (e.g., a message received from an email server, or a web page received from a webserver). The first client 102 may endeavor to verify the authenticity of the certificated item 104, e.g., verification that the certificated item 104 has not been altered by the first node 110 or a third party, and/or verification that the node 110 with which the client 102 is communicating is a party known to the first client 102 and not being impersonated by a third party, such as in a "man-in-the-middle" attack. For example, the client 102 may communicate with a trusted third party via messages stored on an intermediary message server that the first client 102 and/or the third party does not completely trust, and the first client 102 may seek assurance that the node 110 with which the client 102 is communicating is the intermediary message server, and that the messages provided by the intermediary message server have not been altered since authorship by the third party.

In order to provide such verification, a first certificating authority 108 may be provided that has established a level of trust with the first client 102. The first certificating authority 108 may generate a first certificate 106 identifying one or more aspects of the identity of the first node 110 and/or the certificated item 104 (e.g., a hashcode of the content of a message), and cryptographically signed with a credential of the first certificating authority 108 (e.g., using a cryptographic private key of an asymmetric encryption technique). The first certificating authority 108 may then provide the first certificate 106 for the certificated item 104 to the first node 110, which may, in turn, provide the first certificate 106 with the first certificated item 104 to the first client 102. Upon receiving the certificate 106 with the certificated item 104, the first client 102 may authenticate the first certificate 106 with a credential of the first certificating authority 108 (e.g., verifying the signature of the first certificate 106 with a cryptographic public key of the first certificating authority 108), and may compare the first certificate 106 with the certificated item 104 (e.g., comparing a hashcode of the content of the certificated item 104 with the hashcode recorded in the first certificate 106). Verification of the first certificate 106 with the credential of the first certificating authority 108 enables a trust level 118 of the first client 102 in the authenticity of the first certificate 106 (e.g., that the first certificate 106 was actually generated by the first certificating authority 108 and not a third party, and that the first certificate 106 has not been altered subsequent to generation), and an accurate comparison of the first certificate 106 with the first certificated item 104 enables a trust level 118 of the first client 102 in the authenticity of the first certificated item 104 (e.g., that the first certificated item 104 has not been altered since it was presented to the first certificating authority 108 for certification). In this manner, trust levels 118 in certificated items 104 may be established on behalf of clients 102 by certificating authorities 108, even if such certificated items 104 and certificates 106 are handled by untrusted intermediaries.

In view of these techniques, a body of certificating authorities 108 may be created according to a set of security practices. Occasionally, exploits in the body of certificating authorities 108 may prompt changes to the structure and underlying security techniques of such certificating authorities 108. For example, vulnerabilities may be occasionally discovered in some of the mathematical techniques used in certificate generation that enable an attacker to alter the contents of the certificates 106 issued by certificating authorities 108. For instance, the hashing algorithm identified as MD5 was regarded as applicable to a particular set of content with a cryptographic private key, resulting in a hashcode for the content of a certificated item 104 that is verifiable with the corresponding cryptographic public key, that enables the detection of alterations to the signed content, and that cannot be generated without possessing the cryptographic private key corresponding to the cryptographic public key. However, the mathematical techniques comprising the MD5 hashing algorithm is presumed to be resistant to brute-force computational cracking by contemporary computing machinery and techniques, but may be vulnerable to such brute-force computational cracking by computing technologies that may be available in the future. Such brute-force computational cracking allow the generation of certificates 106 without possession of the cryptographic private key, and/or the adjustment of a validly generated hashcode in a manner that verifies against altered content. While such exploits may be computationally very difficult, the feasibility of generating hashcodes for forged or altered certificates 106 has prompted a revocation of public trust in the MD5 hashing algorithm, and has prompted certificating authorities 108 to shift security practices in the generation of certificates 106 from using the MD5 hashing algorithm to other hashing algorithms (such as SHA-2) that are not currently known to present mathematical flaws or vulnerabilities. As another example, hashing techniques such as MD5 may be exploited by computing two different sets of content that result in the same MD5 hashcode. A signature of the first content set by the certificating authority 108 may also authenticate the second content set having the same hashcode, and thus a certificate 106 based on such an MD5 signature may incorrectly certificate two different certificated items 104.

However, difficulties in this technique may arise from a decentralized body of certificating authorities 108. For example, certificating authorities 108 may operate independently, and may not uniformly agree about the selection and implementation of security practices to be used in generating certificates 106. Accordingly, a first certificating authority 108 may use a security practice (such as a particular hashing algorithm) that a second certificating authority 108 considers unsecure. Additionally, incomplete disclosure by a particular certificating authority 108 of the security practices utilized in generating certificates 106 (e.g., policies for rotating certificating credentials) may cause difficulty in assessing the trust level 118 to be placed in the certificates 106 generated by the certificating authority 108. Accordingly, a lack of collective evaluation of trust in certificating authorities 108 may inhibit the evaluation of trust levels 118. For example, a particular client 102 presented with a certificate 106 may have limited access to information as to the trust level 118 to be ascribed to the certificating authority 108 and/or the certificate 106, and may therefore be unable to evaluate the trust level 118 of the certificate 106 beyond the content thereof. Additionally, diagnostic information pertaining to the trust level 118 of certificating authorities may be apparent in patterns of activity in the issuance of a variety certificates 106 by the certificating authority 108 to a variety of clients 102, but the evaluation of such information may be inhibited by the unavailability of mechanisms for collecting and evaluating the certificates 106 issued by the certificating authority 108 and received by a variety of clients 102.

Accordingly, the trust level 118 to be placed in certificating authorities 108 may be subject to exploitation that may be difficult to detect. As a first such example, in some certificating authority scenarios, any certificating authority 108 may issue a public certificate for any network domain. The trust level 118 in the integrity of the certificating authority system may thus be subject to exploitation; e.g., certificates 106 ostensibly representing a first entity (such as a first company or a first national government) may be issued by a certificating authority 108 that is collaborating with an adverse second entity (such as a competing company or a hostile second national government). As a second such example, because certificating authorities 108 may not provide public records of the certificates 106 issued on behalf of various domains, it may be difficult for a domain to detect the issuance of unauthorized certificates on its behalf. As a third such example, it may be difficult to review the security practices utilized by a particular certificating authority 108; e.g., some certificating authorities 108 may be slow or reluctant to transition away from using security practice that is found to be unsecure. As a fourth such example, some types of exploits may be detectable only by a collective evaluation of many certificates; e.g., the issuance of certificates on behalf of a particular domain concurrently by two or more different certificating authorities 108 may raise a security concern, but the detection of this condition may be difficult to discern from the examination of any particular certificate 106 in isolation. Moreover, due to the absence of a collective process to gather, examine, reach a consensus on, and disseminate information about the trust placed in respective certificating authorities makes it difficult for any particular client 102 to determine whether or not to determine the trust level 118 of a certificate 106 issued by a particular certificating authority 108 to a particular node 110, such as a particular domain of the network.

Such problems are further illustrated in the exemplary scenario 100 of FIG. 1. As a first such example, the first client 102 may receive from a second network node 110 a second certificate 106 that is associated 124 with a second certificated item 104, and that indicates issuance by the first certificating authority 108. However, the second certificate 106 may not have been issued by the first certificating authority 108, but may instead have been forged 122 (e.g., by the second network node 110 or a third party) through the exploitation of a security vulnerability (e.g., the use of a compromised credential of the first certificating authority 108). Accordingly, it may be desirable for the client 102 to identify an untrustworthiness 120 of the second certificate 106, but the first client 102 may not be able to determine such untrustworthiness 120 simply by examining the second certificate 106. As a second example, a second certificating authority 108 that exhibits untrustworthiness 120 (e.g., a history of issuing improper certificates 106) may issue a third certificate 106 for a third certificated item 104, and the third certificate 106 may be submitted to the first client 102. However, even if the first client 102 is able to determine the untrustworthiness 120 of the third certificate 106 issued by the second certificating authority 108, such determination of untrustworthiness 120 may not be communicated to a second client 102, which, upon receiving the third certificate 106, may incorrectly determine an acceptable trust level 118 in the third certificate 106 and the second certificating authority 108. Due to these aspects illustrated in the exemplary scenario 100 of FIG. 1 and other aspects of a system of certificating authorities 108, determinations of trust levels 118 of certificating authorities 108 may be difficult.

B. Presented Techniques

Presented herein are techniques that may enable a reduction or avoidance of exploitable vulnerabilities that may arise within a system of certificating authorities 108. In accordance with these techniques, a certificating authority trust service may be devised that collects certificates 106 that have been presented to clients 102 for the authentication of various certificated items 104. For example, the devices utilized by a set of users may automatically submit some received certificates 106 to a certificating authority trust service. Alternatively or additionally, a certificating authority trust service may utilize a set of trusted clients 102 (e.g., a trusted set of crawlers) that automatically explore a set of domains and collect certificates 106 submitted by the domains and apparently issued by a certificating authority 108. The certificates 106 collected from various nodes 110 may be evaluated to evaluate a trust level 118 of the certificating authorities 108, using a variety of heuristics. The certificating authority trust service may generate a certificating authority trust set indicating a trust level 118 for respective certificating authorities 108, and may distribute the certificating authority trust set to a set of clients 102. Each client 102 may then evaluate subsequently received certificates 106 based on the trust level 118 of the certificating authority 108 issuing the certificate 106 as indicated by the certificating authority trust set, as well as various other heuristics for assessing the trust of a certificate 106. These and other techniques may be utilized to detect, disseminate, and utilize a collective certificate trust evaluation process in accordance with the techniques presented herein.

Figure 2:
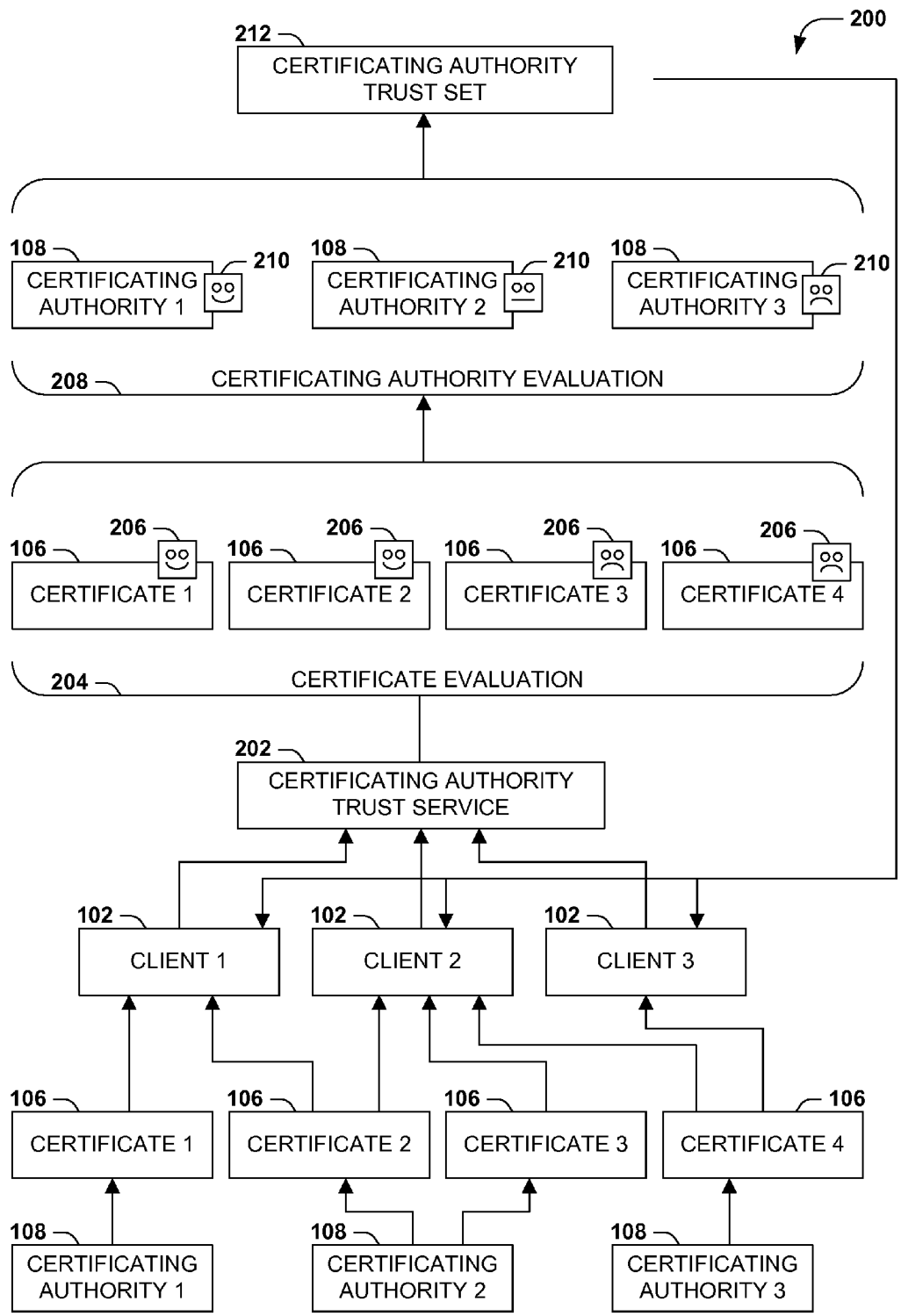
FIG. 2 is an illustration of an exemplary scenario featuring a certificating authority trust service facilitating clients in evaluating certificates received from certificating authorities in accordance with the techniques presented herein.

FIG. 2 presents an illustration of an exemplary scenario 200 featuring the collective evaluation of trust levels of various certificating authorities 108 by a certificating authority trust service 202. In this exemplary scenario 200, a set of certificating authorities 108 issues a set of certificates 106 for various certificated items 104 (e.g., the content of a message or a web page, or an identifying credential of a node 110 such as a website), and the certificates 106 are presented to a set of clients 102 (e.g., directly by the certificating authorities 108, through another client 102, or indirectly by a node 110 of a network). The clients 102 in turn send the certificates 106 (optionally including an identifier of the certificated item 104 and/or the node 110 presenting the certificate 106 to the client 102) to the certificating authority trust service 202. The certificating authority trust service 202 performs a certificate evaluation 204 of respective certificates 106, using a variety of heuristics, in order to determine a certificate trust level 206 of the respective certificates 106. The certificating authority trust service 202 also performs a certificating authority evaluation 208 of the respective certificating authorities 108 based on the certificate trust levels 206 of the certificates 106 that appear to have been issued by that certificating authority 108, and determines a certificating authority trust level 210 of the certificating authority 108. For example, a first certificating authority 210 issuing only certificates 108 having a high certificate trust level 206 (e.g., certificates 108 that present no indication of suspicion or forgery) may be assigned a positive certificating authority trust level 210; a second certificating authority 108 issuing a second certificate 106 having a high certificate trust level 067 and a third certificate 106 having a poor certificate trust level 206 (e.g., a detected forgery of the issuance of the third certificate 206) may be assigned an intermediate certificating authority trust level 210; and a third certificating authority 108 associated with several certificates 106 having a negative certificate trust level 206 may be assigned a negative certificating authority trust level 210. The certificating authority trust service 202 then generates a certificating authority trust set 212 identifying, for respective certificating authorities 108, a certificating authority trust level 210. The certificating authority trust service 202 sends the certificating authority trust set 212 to the clients 102, which may utilize the certificating authority trust set 212 to determine a trust level 118 to be ascribed to certificates 106 apparently issued by the respective certificating authorities 108; upon receiving a certificate 106 for a certificated item 104, a client 102 may ascribe to the certificate 106 and the certificated item 104 a trust level 118 based on the certificating authority trust level 210 of the certificating authority 108 apparently issuing the certificate 106. In this manner, the clients 102 and certificating authority trust service 202 may interoperate to achieve a collaborative collection, determination, and dissemination of trust levels 118 of various certificating authorities 108 and certificates 106 issued thereby in accordance with the techniques presented herein.

C. Exemplary Embodiments

Figure 3:
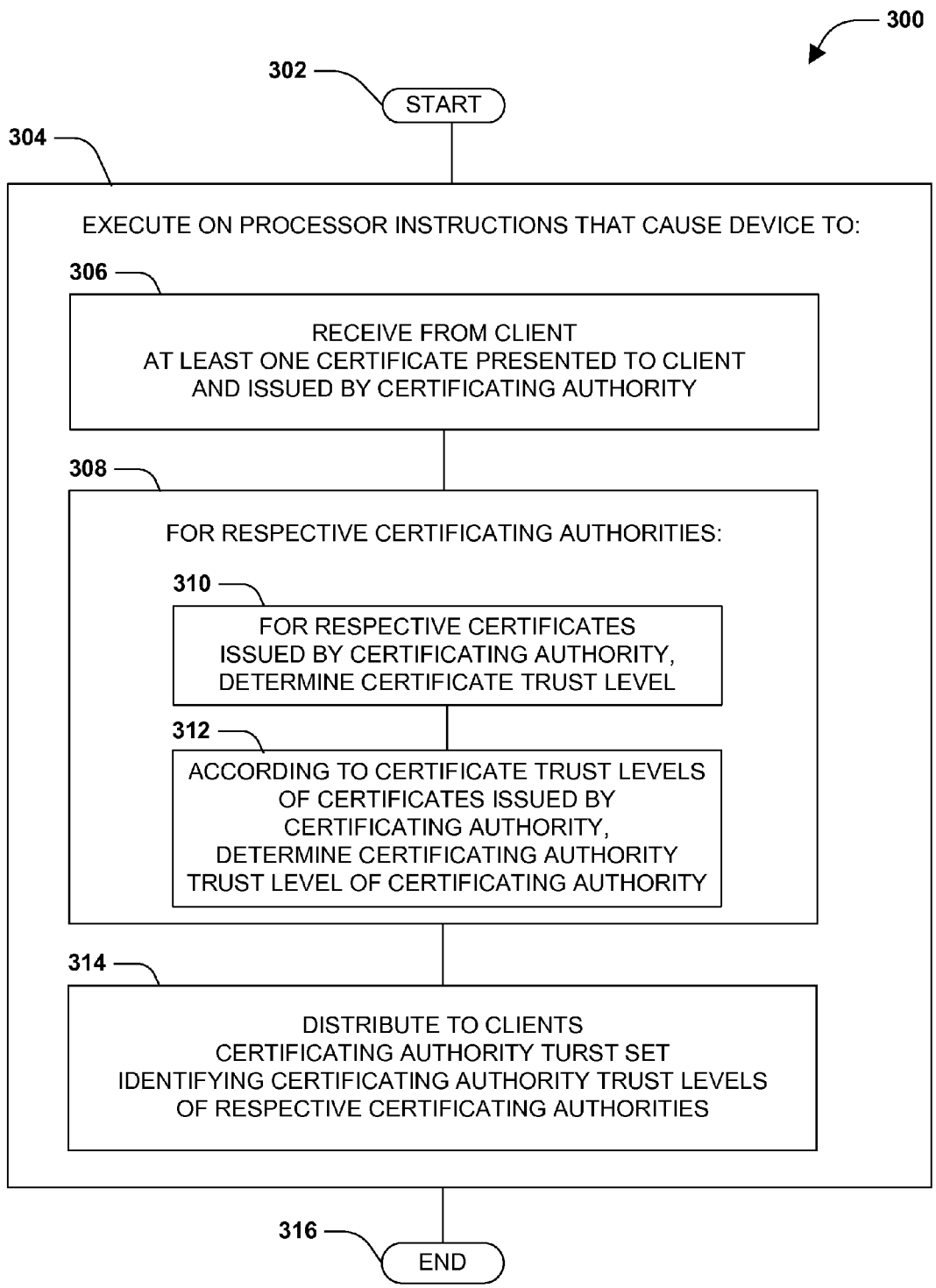
FIG. 3 is an illustration of a first exemplary method of identifying a certificating authority trust level of respective certificating authorities in accordance with the techniques presented herein.

FIG. 3 presents an illustration of an exemplary first embodiment of the techniques presented herein, illustrated as an exemplary method 300 of evaluating certificates 106 respectively issued by a certificating authority 108. The exemplary first method 300 may be implemented, e.g., as a set of instructions stored in a memory component (e.g., a memory circuit, a platter of a hard disk drive, a solid-state storage device, or a magnetic or optical disc) of a device having a processor (e.g., a server providing a certificating authority trust service 202 on behalf of a set of clients 102), where the instructions, when executed on the processor, cause the device to operate according to the techniques presented herein. The exemplary first method 300 begins at 302 and involves executing 304 the instructions on the processor of the device. In particular, the execution of the instructions on the processor causes the device to receive 306 from a client 102 at least one certificate 106 presented to the client 102 and issued by a certificating authority 108. The execution of the instructions on the processor also causes the device to, for respective 308 certificating authorities 108, determine 310 a certificate trust level 206 for respective certificates 106 issued by the certificating authority 108; and, according to the certificate trust levels 206 of the certificates 106 issued by the certificating authority 108, determine 312 a certificating authority trust level 210 of the certificating authority 108. The execution of the instructions on the processor also causes the device to distribute 314 to the clients 102 a certificating authority trust set 212 identifying the certificating authority trust levels 210 of the respective certificating authorities 108. In this manner, the exemplary first method 300 causes the device to facilitate clients 102 in the evaluation of trust levels 118 of certificates 106 for various certificated items 104 in accordance with the techniques presented herein, and so ends at 316.

Figure 4:
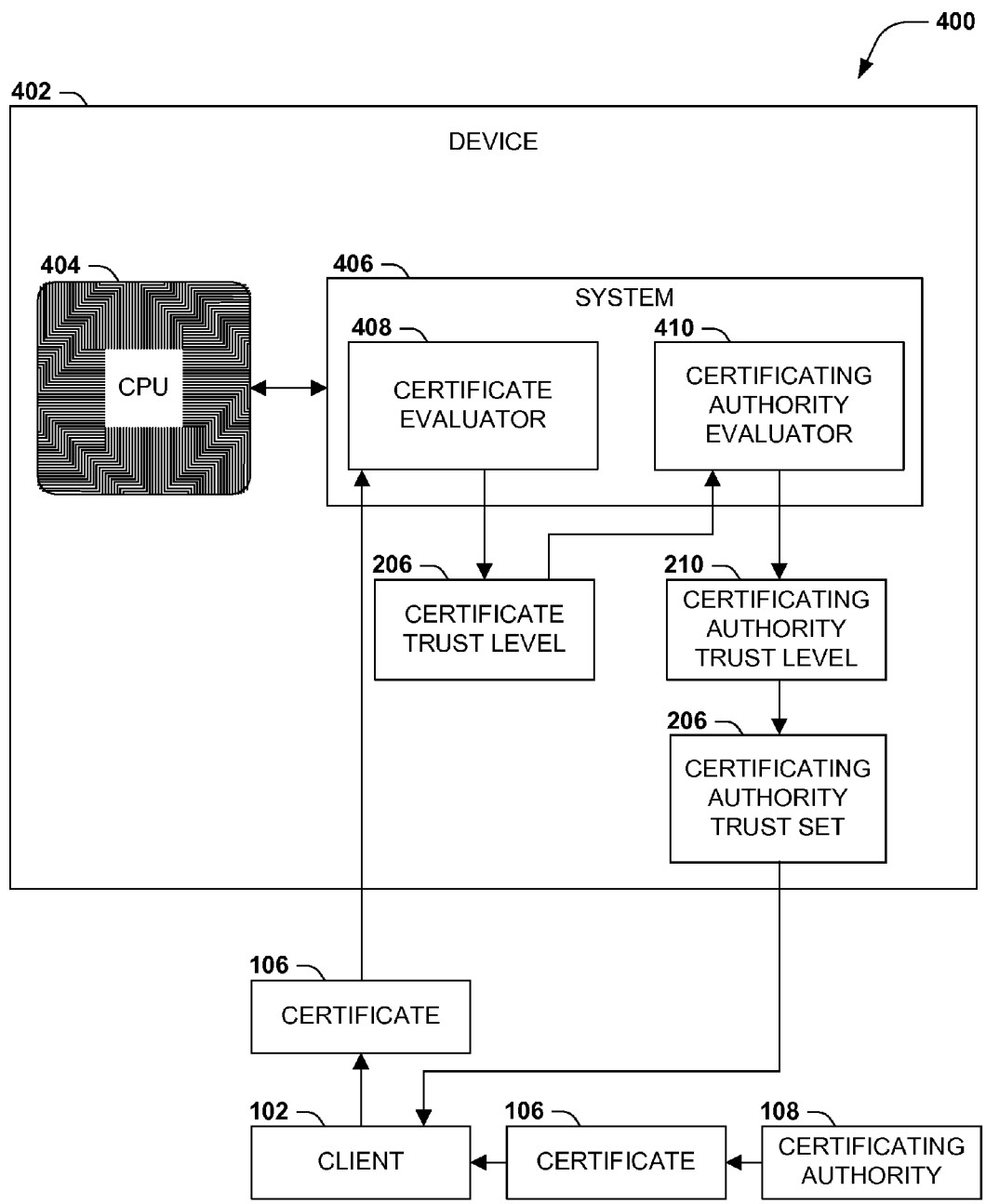
FIG. 4 is a component block diagram illustrating an exemplary system for identifying a certificating authority trust level of respective certificating authorities in accordance with the techniques presented herein.

FIG. 4 presents an illustration of an exemplary second embodiment of the techniques presented herein, illustrated as an exemplary system 406 for enabling a facilitating a client set comprising at least one client 102 in utilizing certificates 106 respectively issued by a certificating authority 108. One or more components of the exemplary system 406 may be implemented, e.g., as instructions stored in a memory component of a device 402 that, when executed on a processor 404 of the device 402, cause the device 402 to perform at least a portion of the techniques presented herein. Alternatively (though not shown), one or more components of the exemplary system 406 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein. The exemplary system 406 includes a certificate evaluator 408 that, upon receiving from a client 102 a certificate 106 presented to the client 102 and issued by a certificating authority 108, evaluates the certificate 106 to determine a certificate trust level 206. The exemplary system 406 also includes a certificating authority evaluator 410 that, for respective certificating authorities 108, determines a certificating authority trust level 210 of the certificating authority, based on the certificate trust levels 206 of the certificates 106 issued by the certificating authority 108. The certificating authority evaluator 410 also generates a certificating authority trust set 212 that identifies, for respective certificating authorities 108, the certificating authority trust level 210 of the certificating authority 108, and sends the certificating authority trust set 212 to the clients 102. In this manner, the exemplary system 406 enables the clients 102 to evaluate the trust levels 118 of certificates 106 received for various certificated items 104 in accordance with the techniques presented herein.

Figure 5:
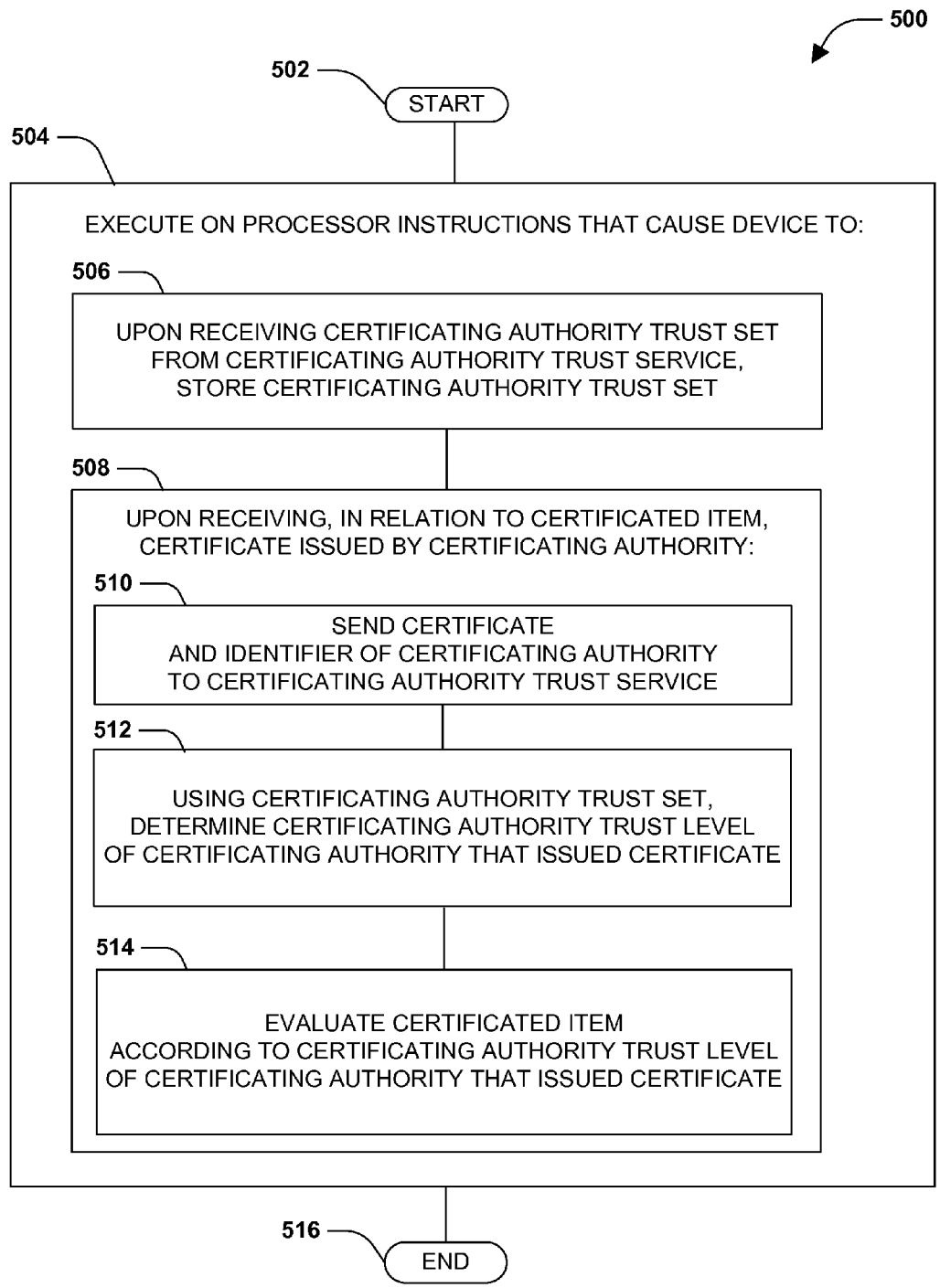
FIG. 5 is an illustration of a second exemplary method of identifying a certificating authority trust level of respective certificating authorities in accordance with the techniques presented herein.

FIG. 5 presents an illustration of an exemplary third embodiment of the techniques presented herein, illustrated as an exemplary second method 500 of evaluating certificates 106 issued by certificating authorities 108 to a device having a processor and communicating with a certificating authority trust service 202. The exemplary second method 500 may be implemented, e.g., as a set of instructions stored in a memory component (e.g., a memory circuit, a platter of a hard disk drive, a solid-state storage device, or a magnetic or optical disc) of a device having a processor (e.g., a client 102 of the certificating authority trust service 202), where the instructions, when executed on the processor, cause the device to operate according to the techniques presented herein. The exemplary second method 500 begins at 502 and involves executing 504 the instructions on the processor of the device. In particular, the execution of the instructions on the processor causes the device to, upon receiving from the certificating authority trust service 202 a certificating authority trust set 212 that identifies, for respective certificating authorities 108, a certificating authority trust level 210 of the certificating authority 108, store 506 the certificating authority trust set 212. The execution of the instructions on the processor also causes the device to, upon receiving 508, associated with a certificated item 104, a certificate 106 issued by a certificating authority 108, send 510 the certificate 106 to the certificating authority trust service 202; using the certificating authority trust set 212, determine 512 the certificating authority trust level 210 of the certificating authority 108 that issued the certificate 106; and evaluate 514 the certificated item 104 according to the certificating authority trust level 210 of the certificating authority 108 that issued the certificate 106 for the certificated item 104. In this manner, the exemplary second method 500 enables a device (such as a client 102) to evaluate certificated items 104 according to the trust level 118 of the certificating authority 108 issuing a certificate 106 for the certificated item 104 in accordance with the techniques presented herein, and thus ends at 516.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
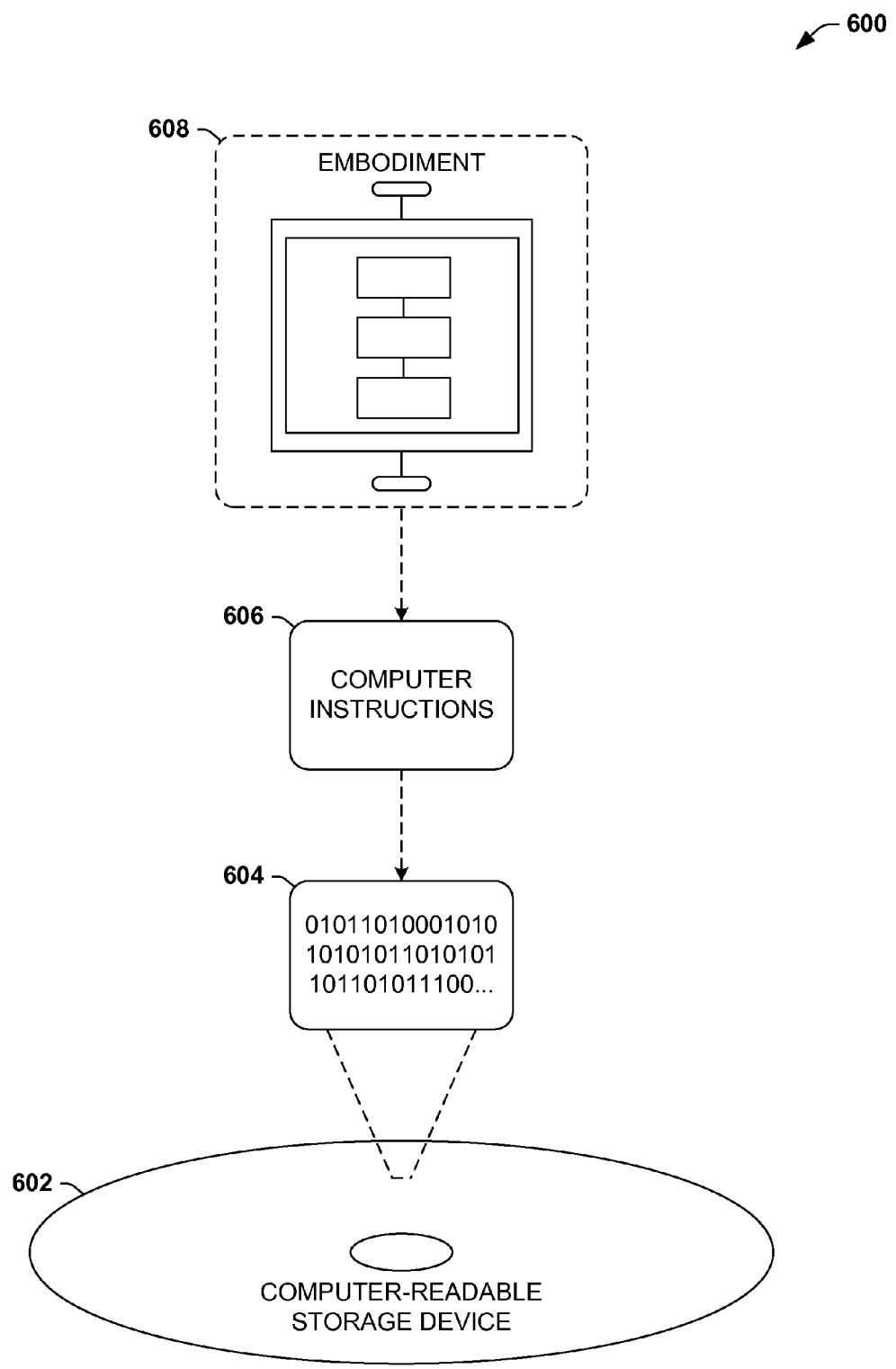
FIG. 6 is an illustration of an exemplary computer-readable medium including processor-executable instructions configured to embody one or more of the provisions set forth herein.

An exemplary computer-readable medium that may be devised in these ways is illustrated in FIG. 6, wherein the implementation 600 comprises a computer-readable storage device 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In a first such embodiment, the processor-executable instructions 606 may be configured to cause a device to perform a method 608 of configuring a device (such as a server providing a certificating authority trust service 202) to evaluate certificates 106 respectively issued by a certificating authority 108, such as the exemplary method 300 of FIG. 3. In a second such embodiment, the processor-executable instructions 606 may be configured to implement one or more components of a system of evaluating certificates 106 respectively issued by a certificating authority 108, such as the exemplary system 406 of FIG. 4. In a third such embodiment, the processor-executable instructions 606 may be configured to cause a device (such as a client 102) to perform a method of evaluating certificates 106 issued by a certificating authority 108, such as the exemplary method 500 of FIG. 5. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary first method 300 of FIG. 3; the exemplary system 406 of FIG. 4; the exemplary second method 500 of FIG. 5; and the exemplary computer-readable storage device 602 of FIG. 6) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of clients 102, such as devices operated by one or more users; one or more applications executing on such devices; and/or online services provided on behalf of one or more users or other applications.

As a second variation of this first aspect, the techniques presented herein may be utilized to determine a trust level 118 in various types of certificated items 104 presented to and/or accessed by a client 102, such as messages; applications; websites; and/or identifying credentials of one or more nodes 110 of a network.

As a third variation of this first aspect, the techniques presented herein may be utilized to evaluate the trust levels 118 of various types of certificates 106 issued by various types of certificating authorities 108, such as the X.509 certification-based trust infrastructure.

As a fourth variation of this first aspect, many types of certificating authority trust services 202 may be provided to facilitate the evaluation by clients 102 of trust levels 118 of various certificates 106 and certificating authorities 108. Such certificating authority trust services 202 may comprise a public service provided to any client 102, or a semi-private or private service provided to a specific set of clients 102. Alternatively or additionally, a certificating authority trust service 202 may identify the certificating authority trust levels 210 of any certificating authority 108, or of only a subset of certificating authorities 108, such as those issuing particular types of certificates 106; those issuing certificates 106 only for a particular set of certificated items 104; or those interoperating on behalf of a particular set of nodes 110 and/or clients 102.

As a fifth variation of this first aspect, one or more clients 102 may utilize the certificating authority trust set 212 in various ways. As a first such example, a client 102 may only permit access to certificated items 104 that are associated with a certificate 106 issued by a certificating authority 108 having a high certificating authority trust level 210 specified in the certificating authority trust set 212, and may restrict access to other certificated items 104. As a second such example, a client 102 may permit access to certificated items 104 certified by certificates 106 issued by certificating authorities 108 that are not associated with a high certificating authority trust level 210 according to the certificating authority trust set 212, but may do so only after warning a user of the certificating authority trust level 210 of the certificating authority 108, and/or may provide access within tightened security credentials (e.g., executing a first application certified by a first certificate 106 issued by a first certificating authority 108 having a high certificating authority trust level 210 natively and with a high level of privileges; and executing a second application certified by a second certificate 106 executed by a second certificating authority 108 having a low certificating authority trust level 210 with a restricted set of privileges, such as within an isolation construct, such as a virtual machine having limited access to the device of the user). These and other scenarios may be compatible with the application of the techniques presented herein.

D2. Certificating Authority Trust Set

A second aspect that may vary among embodiments of the techniques presented herein relates to the generation, use, and content of the certificating authority trust set 212 generated by the certificating authority trust service 202 and distributed to the clients 102.

As a first variation of this second aspect, the certificating authority trust set 212 may identify the certificating authority trust levels 210 assigned to the certificating authorities 108 in various ways. For example, the certificating authority trust set 212 may identify that respective certificating authorities 108 are trustworthy or untrustworthy, or may indicate a degree of trustworthiness (e.g., a percentage or letter score) for the certificating authority 108. As another example, the certificating authority trust set 212 may identify a particular certificating authority trust level 210 of the certificating authority 108 for particular types of certificates 106 and/or certificated items 104.

As a second variation of this second aspect, a certificating authority trust service 202 may determine the certificate trust levels 206 of various certificates 106, and/or the certificating authority trust levels 210 of various certificating authorities 108, in various ways. Many types of heuristics and rules may be utilized in such determinations, based on an evaluation of factors such as the content of the certificate 106, the certificated item 104 certified by the certificate 106, and the node 110 presenting the certificate 106.

As a third variation of this second aspect, upon receiving a certificate 106 issued by a selected certificating authority 108 that does not yet have a certificating authority trust level 210 in the certificating authority trust set 212 (such as a new, newly participating, or first observed certificating authority 108), a device (such as a certificating authority trust service 202 or a client 102) may store in the certificating authority trust set 212 an untrusted certificating authority trust level for the selected certificating authority 108 (e.g., initially establishing a low trust level 118 for the certificating authority 108, until the certificating authority 108 has consistently demonstrated verifiable trustworthiness).

As a fourth variation of this second aspect, the certificating authority trust set 212 may further identify, the certificate trust levels 206 of one or more certificates 106. For example, the certificating authority trust set 212 may specify that one or more certificates 106 issued by a particular certificating authority 108 are trustworthy, or are untrustworthy (e.g., a list of certificates 106 that have been revoked by the certificating authority 108 following the discovery of a security vulnerability affecting the trust level 118 of those certificates 106). A client 102 may, upon receiving a certificate 106, determine the certificate trust level 206 of the certificate 106 specified by the certificating authority trust set 212, and evaluate the certificated item 104 according to the certificating authority trust level of the certificating authority that issued the certificate for the certificated item, and the certificate trust level of the certificate specified by the certificating authority trust set.

As a fifth variation of this second aspect, one or more clients 102 may also be configured to send to the certificating authority trust service 202 only particular types of certificates 106. As a first such example, where the certificating authority trust set 212 specifies certificate trust levels 206 for one or more certificates 106, a client 102 may be configured to submit to the certificating authority trust service 202 only certificates 106 that do not have a certificate trust level 206 in the certificate authority trust set 212 (e.g., only certificates 106 that the certificating authority trust service 202 has not yet evaluated). As a second such example, one or more clients 102 may configured to send to the certificating authority trust service 202 only certificates 106 that are associated with a publicly accessible certificated item 104 (e.g., only for publicly accessible domains). These and other variations in the generation and distribution of the certificating authority trust set may be utilized in embodiments of the techniques presented herein.

D3. Trusted Client Set

A third aspect that may vary among embodiments of the techniques presented herein relates to the use of a trusted client set by a certificating authority trust service 202. In scenarios where the certificating authority trust service 202 receives and evaluates certificates 106 from certificating authorities 108 from a variety of clients 102 (e.g., a publicly accessible certificating authority trust service 202), the trust level of the clients 102 may vary; e.g., a particular client 102 may seek to degrade a trust level 118 of a certificated item 104, a certificate 106, a certificating authority 108, or a node 110 by submitting a tampered certificate 106 to the certificating authority trust service 202. While a consensus approach may alleviate some instances of such degradation of trust (e.g., determining the certificating authority trust level 210 of a certificating authority 108 according to a consensus evaluation of a large set of certificates 106 submitted by a large set of clients 104), a distributed-denial-of-service attack (e.g., submitting a large number of tampered certificates 106 from a large number of cooperating clients 104) may skew the consensus determination.

In view of these observations, it may be desirable for a certificating authority trust service 202 to receive certificates 106 from at least one trusted client 102, in addition to at least one untrusted client 102 of a client set, and to determines the certificate trust levels 206 of the certificates 106 by identifying the client 102 sending the certificate 106 as an untrusted client or a trusted client. Upon identifying the client 102 as an untrusted client, a certificate evaluator may determine the certificate trust level 206 of the certificate 106 with a first certificate trust level confidence; and upon identifying the client 102 as a trusted client, the certificate evaluator may determine the certificate trust level 206 of the certificate 106 with a second certificate trust level confidence that is higher than the first certificate trust level confidence. Alternatively or additionally, the certificating authority trust service 202 may instruct the trusted clients to explore particular nodes 110 of a network in response to requests submitted by untrusted clients (e.g., directing a trusted crawler to crawl one or more websites associated with a particular domain reported according to a selection criteria set, such as a new node selection criterion that identifies the selected node 110 as a new node of the network; and a suspicious node activity selection criterion that associated the node with at least one potentially suspicious node activity). Upon receiving a certificated item 104 from a selected node 110 of a network, a client 102 may send to the certificating authority trust service 202 a request to explore the selected node 110 of the network; and a trusted client controller of the certificating authority service 202 may instruct a trusted client to explore a network comprising at least one node 110, and upon receiving a certificate 106 issued by a certificating authority while exploring a selected node 110 of the network, send the certificate 106 and an identifier of the certificating authority 108 to the certificate evaluator. In some scenarios, respective trusted clients of the trusted client set may be associated with a trusted client region (e.g., a particular geographic region), and respective nodes 110 of the network are associated with a node region. The trusted client controller may instruct respective trusted clients to explore the network by, for respective selected nodes to be explored, identifying the node region of the selected node 110; identifying a selected trusted client that is associated with a trusted client region correlated with the node region of the selected node 110; and instructing the selected trusted client to explore the selected node 110 of the network.

Figure 7:
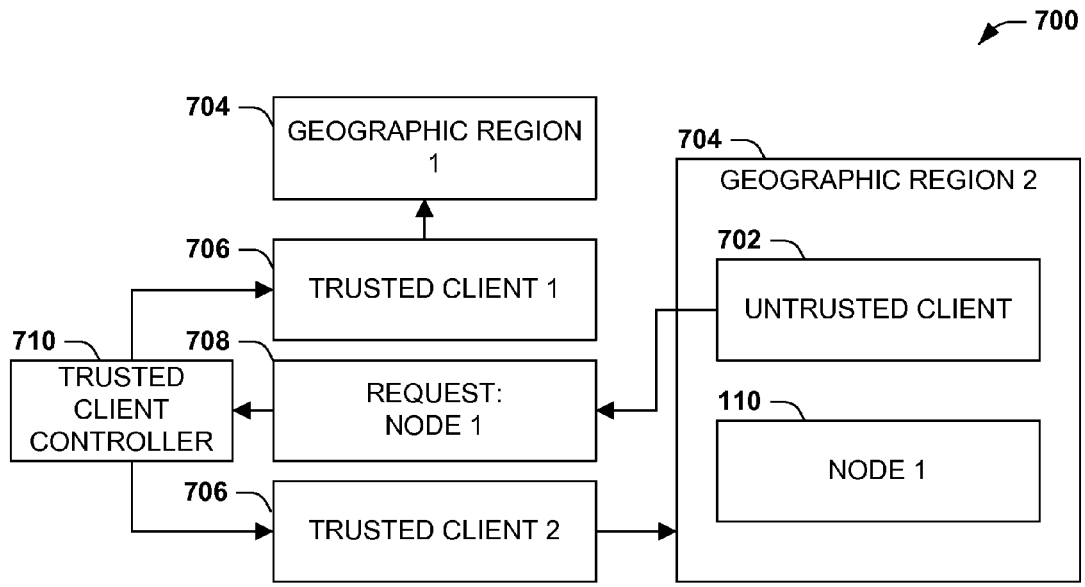
FIG. 7 is an illustration of an exemplary scenario featuring a trusted client controller instructing trusted clients to explore a node of a network in accordance with the techniques presented herein.

FIG. 7 presents an illustration of an exemplary scenario 700 featuring several such variations of a certificating authority trust service 202. In this exemplary scenario, an untrusted client 702 encounters a node 110 from a first geographic region 704, and may wish the node 110 to be explored by the certificating authority trust service 202 (e.g., a node 110 submitting a certificate 106 issued by a certificating authority 108 for a certificated item 104 such as a message or a website), and sends a request 708 to a trusted client controller 710 of the certificating authority trust service 202 to explore the node 704. The trusted client controller 710 may interoperate with a set of trusted clients 706, each associated with a geographic region 704. In order to fulfill the request 708 of the untrusted client 702, the trusted client controller 710 may identify a selected trusted client 706 that is associated with the same geographic region 704 as the node 110, and may instruct the selected trusted client 706 to explore the node 110 (e.g., crawling the set of websites provided within a domain) and to submit for evaluation any certificates 106 received during the exploration of the node 110. In this manner, the trusted client controller 710 may utilize the trusted clients 706 to explore nodes 110 in accordance with several variations of the techniques presented herein.

D4. Interoperation with Certificating Authorities

A fourth aspect that may vary among embodiments of the techniques presented herein relates to the interoperation of a certificating authority trust service 202 with certificating authorities 106. For example, the certificating authority trust service 202 may assist the certificating authorities 106 with the identification of detected vulnerabilities and/or the implementation of security practices that may improve the certificating authority trust level 210 of the certificating authority 108.

As a first variation of this fourth aspect, a certificating authority trust service 202 may notify a certificating authority 108 of events relating to its certificating authority trust level 210, such as receiving from a client 102 a selected certificate 106 issued by a certificating authority 108 that has not previously been evaluated (e.g., a previously unseen certificate 106 apparently issued by the certificating authority 108), and/or upon determining, an untrusted certificate trust level for a selected certificate 108 (e.g., upon detecting a suspicious certificate 106 that appears to have been tampered and/or forged).

As a second variation of this fourth aspect, upon receiving from a certificating authority 108 a trust level disclosure request (e.g., a request by the certificating authority 108 to disclose its certificating authority trust level 210), a certificating authority trust service 202 may disclose the certificating authority trust level 210 of the certificating authority 108 in the certificating authority trust set 212 to the certificating authority 108.

As a third variation of this fourth aspect, the certificating authority trust service 202 may identify one or more security practices that, if implemented by a particular certificating authority 108, alleviates a low or untrusted certificate trust level 206 of at least one certificate 106 issued by the certificating authority 108 (e.g., identifying an unsecure hashing algorithm utilized by the certificating authority 108 to sign some certificates 106), and may notify the certificating authority 108 of the security practice that may be implemented to raise the certificating authority trust level 210 of the certificating authority 108. Additionally, the certificating authority trust service 202 may monitor the certificating authority 108 to detect the implementation of the identified security practice (e.g., the alleviation of a security vulnerability), and may raise the certificating authority trust level 210 of the certificating authority 108 upon detecting the implementation of the security practice, and/or reduce the certificating authority trust level 210 of the certificating authority 108 upon detecting a failure of the certificating authority 108 to implement the security practice within an implementation period.

Figure 8:
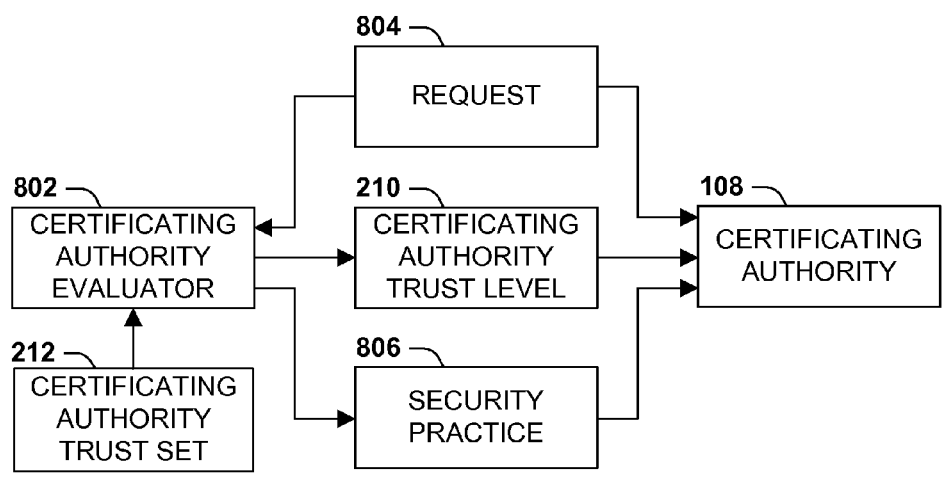
FIG. 8 is an illustration of an exemplary scenario featuring a certificating authority evaluator interoperating with a certificating authority regarding a certificating authority trust level in accordance with the techniques presented herein.

FIG. 8 presents an illustration of an exemplary scenario 800 featuring the interoperation of a certificating authority trust service 202 and a certificating authority 108. In this exemplary scenario 800, a certificating authority evaluator 802 of the certificating authority trust service 202 may receive a request 804 from a certificating authority 108 to disclose its certificating authority trust level 210, and may accordingly disclose the certificating authority trust level 210 identified in the certificating authority trust set 212 to the certificating authority 108. Additionally, the certificating authority evaluator 802 may identify a security practice 806 that, if implemented by the certificating authority 108, may raise the certificating authority trust level 210 (e.g., switching from a less reliable hashing algorithm to a more reliable hashing algorithm), and may advise the certificating authority 108 of the security practice 806. The certificating authority evaluator 802 may then monitor the certificating authority 108 for the implementation of the security practice 806, and, upon detecting an implementation of the security practice 806, may raise the certificating authority trust level 210 of the certificating authority 108 in the certificating authority trust set 212. In this manner, the certificating authority trust service 202 may interoperate with certificating authorities to establish, raise, and maintain the security practices 806 utilized thereby and the certificating authority trust levels 210 of the certificating authorities, in accordance with several variations of the techniques presented herein.

E. Computing Environment

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 9:
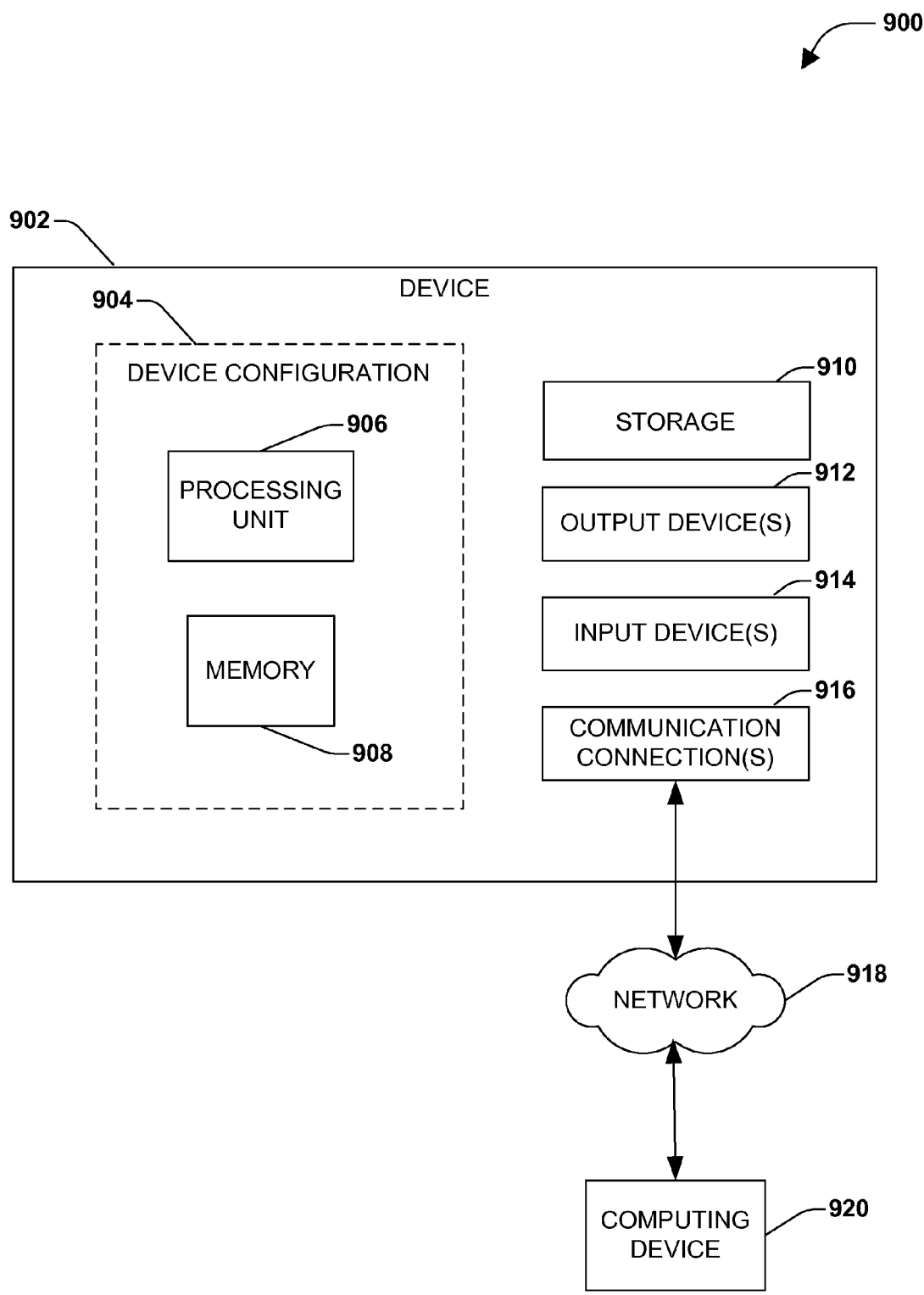
FIG. 9 is an illustration of an exemplary computing environment wherein a portion of the present techniques may be implemented and/or utilized.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Use of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of informing a client set comprising a first client device and a second client device, of trustworthiness of certificates on a server device having a processor, the method comprising:
   executing on the processor instructions that cause the server device to:
      receive, from the first client device, at least one certificate presented to the first client device and issued by a certificating authority to authenticate a certificated item requested by the first client device;
      for respective certificating authorities:
         for respective certificates issued by the certificating authority, determine a certificate trust level; and
         according to the certificate trust levels of the certificates issued by the certificating authority, determine a certificating authority trust level of the certificating authority; and
         distribute, to the client set including the first client device and the second client device, a certificating authority trust set identifying the certificating authority trust levels to be accorded to certificates issued by the respective certificating authorities and subsequently received by at least one of the first client device and the second client device.

2. The method of claim 1, wherein the certificating authority trust set further identifies, for at least one certificate, the certificate trust level of the certificate.

3. The method of claim 1, further comprising: responsive to receiving a certificate issued by a selected certificating authority that does not have a certificating authority trust level in the certificating authority trust set, storing in the certificating authority trust set an untrusted certificating authority trust level for the selected certificating authority.

4. The method of claim 1, further comprising: responsive to receiving from a certificating authority a trust level disclosure request, disclose to the certificating authority the certificating authority trust level of the certificating authority in the certificating authority trust set.

5. The method of claim 1, further comprising: responsive to receiving from the first client device a selected certificate issued by a certificating authority that has not previously been evaluated, notify the certificating authority of the selected certificate.

6. The method of claim 1, further comprising: responsive to determining, for a selected certificate, an untrusted certificate trust level, notify the certificating authority issuing the selected certificate of the untrusted certificate trust level for the selected certificate.

7. The method of claim 6, wherein:
   the method further comprises: identifying a security practice that, if implemented by the certificating authority, alleviates the untrusted certificate trust level of at least one certificate issued by the certificating authority; and
   notifying the certificating authority further comprises: notifying the certificating authority of the security practice.

8. The method of claim 7, further comprising: responsive to detecting, after notifying the certificating authority of the security practice, a failure of the certificating authority to implement the security practice within an implementation period, reducing the certificating authority trust level of the certificating authority.

9. A system for facilitating a client set, comprising a first client device and a second client device, in utilizing certificates, the system comprising:
- a certificate evaluator that, responsive to receiving from the first client device a certificate issued to the first client device by a certificating authority to authenticate a certificated item requested by the first client device, evaluates the certificate to determine a certificate trust level; and
- a certificating authority evaluator that:
  - for respective certificating authorities, determines a certificating authority trust level of the certificating authority based on the certificate trust levels of the certificates issued by the certificating authority;
  - generates a certificating authority trust set that identifies, for respective certificating authorities, the certificating authority trust level to be accorded to certificates issued by the certificating authority and subsequently received by at least one of the first client device and the second client device; and
  - sends the certificating authority trust set to the client set including the first client device and the second client device.

10. The system of claim 9, wherein:
the client set comprises:
- at least one untrusted client device, and
- at least one trusted client device; and the certificate evaluator determines the certificate trust level of the certificates by:
- identifying the first client device sending the certificate as an untrusted client device or a trusted client device;
- responsive to identifying the client device as an untrusted client device, determining the certificate trust level of the certificate with a first certificate trust level confidence; and
- responsive to identifying the first client device as a trusted client device, determining the certificate trust level of the certificate with a second certificate trust level confidence that is higher than the first certificate trust level confidence.

11. The system of claim 10, wherein the certificating authority evaluator determines the certificating authority trust level for respective certificating authorities according to, for respective certificates issued by the certificating authority, the certificate trust level and a certificate trust level confidence of the certificate trust level.

12. The system of claim 10, wherein the system further comprises a trusted client device controller that, for respective trusted client devices, instructs the trusted client device to:
- explore a network comprising at least one node; and
- responsive to receiving a certificate issued by a certificating authority while exploring a selected node of the network, send the certificate and an identifier of the certificating authority to the certificate evaluator.

13. The system of claim 12, wherein the trusted client device controller instructs respective trusted client devices to explore the network by, responsive to receiving from at least one untrusted client device a selected node of the network that is to be explored, instructing the trusted client device to explore the selected node of the network.

14. The system of claim 12, wherein the selected node of the network is selected according to a selection criteria set comprising:
- a new node selection criterion that identifies the selected node as a new node of the network; and
- a suspicious node activity selection criterion that associated the node with least one potentially suspicious node activity.

15. The system of claim 12, wherein:
- respective trusted client devices of the trusted client set are associated with a trusted client device region;
- respective nodes of the network are associated with a node region; and
- the trusted client device controller instructs respective trusted client devices to explore the network by, for respective selected nodes to be explored:
  - identify the node region of the selected node;
  - identify a selected trusted client that is associated with a trusted client region correlated with the node region of the selected node; and
  - instruct the selected trusted client to explore the selected node of the network.

16. A method of evaluating certificates respectively issued to a device having a processor and communicating with a certificating authority trust service, the method comprising:
executing, on the processor, instructions that cause the device to:
- responsive to receiving from the certificating authority trust service a certificating authority trust set that identifies certificating authority trust levels to be accorded to certificates issued by the respective certificating authorities and subsequently received by the device, wherein the certificate authority trust set is based at least in part on an evaluation of a certificate issued by a certificating authority to a second client device of a client set including the device and forwarded by the second client device to the certificating authority trust service for evaluation, store the certificating authority trust set; and
- responsive to receiving, associated with a certificated item, a certificate issued by a certificating authority:
  - send the certificate to the certificating authority trust service;
  - using the certificating authority trust set, determine the certificating authority trust level of the certificating authority that issued the certificate; and
  - evaluate the certificated item according to the certificating authority trust level of the certificating authority that issued the certificate for the certificated item.

17. The method of claim 16, wherein:
the certificating authority trust set further identifies, for at least one certificate, the certificate trust level of the certificate;
the method further comprises: responsive to receiving a certificate issued by a certificating authority, determine the certificate trust level of the certificate specified by the certificating authority trust set; and
evaluating the certificated item further comprises: evaluating the certificated item according to the certificating authority trust level of the certificating authority that issued the certificate for the certificated item, and the certificate trust level of the certificate specified by the certificating authority trust set.

18. The method of claim 17, wherein sending the certificate to the certificating authority trust service further comprises: sending the certificate to the certificating authority trust service only for certificates that do not have a certificate trust level in the certificate authority trust set.

19. The method of claim 16, wherein sending the certificate to the certificating authority trust service further comprises: sending the certificate and an identifier of the certificating authority to the certificating authority trust service only for certificates associated with a publicly accessible certificated item.

20. The method of claim 16, further comprising: responsive to receiving a certificated item from a selected node of a network, send to the certificating authority trust service a request to explore the selected node of the network.

21. A client device that determines trustworthiness of certificates for certificated items, the client device comprising:
   a processor; and
   a memory storing instructions that, when executed by the processor, cause the client device to:
   responsive to receiving, from a certificating authority trust service, a certificating authority trust set identifying certificating authority trust levels to be accorded to certificates issued by the respective certificating authorities and subsequently received by the client device, wherein the certificate authority trust set is based at least in part on an evaluation of a certificate issued by a certificating authority to a second client device of a client set including the client device and forwarded by the second client device to the certificating authority trust service for evaluation, store the certificating authority trust set; and
   responsive to receiving, for a certificated item, a certificate presented to the client device and issued by the certificating authority:
      send the certificate to the certificating authority trust service;
      using the certificating authority trust set, determine a certificating authority trust level of the certificating authority that issued the certificate; and
      handle the certificated item according to the certificating authority trust level of the certificating authority that issued the certificate for the certificated item.

22. A system for facilitating a client device in utilizing certificates, the system comprising:
   a certificating authority trust set store that, responsive to receiving, from a certificating authority trust service, a certificating authority trust set identifying certificating authority trust levels to be accorded to certificates issued by the respective certificating authorities and subsequently received by the client device, wherein the certificate authority trust set is based at least in part on an evaluation of a certificate issued by a certificating authority to a second client device of a client set including the client device and forwarded by the second client device to the certificating authority trust service for evaluation, stores the certificating authority trust set; and
   a certificate evaluator that, responsive to receiving, for a certificated item, a certificate presented to the client device and issued by the certificating authority:
      sends the certificate to the certificating authority trust service;
      using the certificating authority trust set, determines a certificating authority trust level of the certificating authority that issued the certificate; and
      handles the certificated item according to the certificating authority trust level of the certificating authority that issued the certificate for the certificated item.

* * * * *